United States Patent
Tsirkin et al.

(10) Patent No.: US 10,203,980 B2
(45) Date of Patent: *Feb. 12, 2019

(54) DYNAMIC BATCH MANAGEMENT OF SHARED BUFFERS FOR VIRTUAL MACHINES

(71) Applicant: Red Hat Israel, Ltd., Ra'anana (IL)

(72) Inventors: Michael S. Tsirkin, Ra'anana (IL); Thomas Graf, Fehraltorf (CH)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,056

(22) Filed: Jan. 19, 2018

(65) Prior Publication Data

US 2018/0143847 A1 May 24, 2018

Related U.S. Application Data

(63) Continuation of application No. 15/174,637, filed on Jun. 6, 2016, now Pat. No. 9,886,302, which is a (Continued)

(51) Int. Cl.
*G06F 9/455* (2018.01)
*H04L 29/08* (2006.01)
(Continued)

(52) U.S. Cl.
CPC .......... *G06F 9/45558* (2013.01); *G06F 3/061* (2013.01); *G06F 3/067* (2013.01);
(Continued)

(58) Field of Classification Search
CPC ......... G06F 9/52; G06F 9/505; G06F 9/45533
(Continued)

(56) References Cited

U.S. PATENT DOCUMENTS 5,826,041 A 10/1998 Ogus
6,370,619 B1 4/2002 Ho et al.
(Continued)

OTHER PUBLICATIONS

Zhang, Xiaolan et al., XenSocket: A High-Throughput Interdomain Transport for Virtual Machines, IBM T.J. Watson Research Center, 19 Skyline Drice, Hawthorne, NY 10532, USA, Arlington, VA, USA, Middleware 2007, LNCS, pp. 184-203, 20 pages—http://citeseerx.ist.psu.edu/viewdoc/download?doi=10.1.1.90.1901&rep=rep1&type=pdf.

(Continued)

*Primary Examiner* — Phillip H Nguyen
(74) *Attorney, Agent, or Firm* — Haynes and Boone, LLP

(57) ABSTRACT

Methods, systems, and computer program products for providing dynamic batch management of shared packet buffers are disclosed. A virtualized computer system may include a hypervisor with access to memory and executed by a processor to maintain a pool of host memory to store a plurality of incoming network packets received by a network device, adjust a number of memory buffers associated with the pool of host memory to resize the pool of host memory, receive an indication of an incoming network packet stored in the pool of host memory by the network device, and provide the incoming network packet to a guest. In an example, the hypervisor uses the pool of host memory to perform batch processing of the incoming network packets and dynamically adjusts the size of the pool during the processing by adding or removing memory buffers in response to an event, condition, request, etc.

25 Claims, 4 Drawing Sheets

Related U.S. Application Data continuation of application No. 14/472,584, filed on Aug. 29, 2014, now Pat. No. 9,367,343.

(51) Int. Cl.
  *G06F 9/50* (2006.01)
  *G06F 9/48* (2006.01)
  *G06F 9/52* (2006.01)
  *G06F 3/06* (2006.01)

(52) U.S. Cl.
  CPC .......... *G06F 3/0631* (2013.01); *G06F 3/0644* (2013.01); *G06F 3/0656* (2013.01); *G06F 3/0664* (2013.01); *G06F 9/45533* (2013.01); *G06F 9/45545* (2013.01); *G06F 9/4843* (2013.01); *G06F 9/505* (2013.01); *G06F 9/5016* (2013.01); *G06F 9/52* (2013.01); *H04L 67/2842* (2013.01); *G06F 2009/45583* (2013.01); *G06F 2009/45595* (2013.01)

(58) Field of Classification Search
  USPC ............................................ 718/1, 105, 104
  See application file for complete search history.

(56) References Cited

U.S. PATENT DOCUMENTS

| | | |
|---|---|---|
| 7,631,147 B2 | 12/2009 | Ganguly |
| 7,721,299 B2 | 5/2010 | Van Riel |
| 8,250,586 B2 | 8/2012 | Nelson |
| 8,537,860 B2 | 9/2013 | Kidambi et al. |
| 8,561,066 B2 | 10/2013 | Koch et al. |
| 8,665,725 B2 | 3/2014 | Kwan et al. |
| 8,667,187 B2 | 3/2014 | Thakkar |
| 8,990,799 B1 | 3/2015 | Forecast |
| 9,367,343 B2 | 6/2016 | Tsirkin |
| 2005/0207407 A1 | 9/2005 | Baumberger |
| 2010/0005464 A1 | 1/2010 | Malyugin et al. |
| 2010/0325374 A1 | 12/2010 | Cypher et al. |
| 2011/0125949 A1 | 5/2011 | Mudigonda et al. |
| 2011/0153953 A1 | 6/2011 | Khemani et al. |
| 2011/0314469 A1 | 12/2011 | Qian et al. |
| 2012/0147890 A1 | 6/2012 | Kikuchi |
| 2012/0250512 A1 | 10/2012 | Jagadeeswaran |
| 2012/0307838 A1 | 12/2012 | Manula |
| 2013/0036093 A1 | 2/2013 | Heiser et al. |
| 2013/0117486 A1 | 5/2013 | Daniel |
| 2013/0155083 A1 | 6/2013 | McKenzie et al. |
| 2013/0262868 A1 | 10/2013 | Friedman et al. |
| 2013/0332678 A1 | 12/2013 | Fitzpatrick et al. |
| 2014/0059537 A1 | 2/2014 | Kamble et al. |
| 2014/0281119 A1 | 9/2014 | Hyun |
| 2015/0055468 A1 | 2/2015 | Agarwal |

OTHER PUBLICATIONS

Druschel, Peter et al., Fbufs: A High-Bandwidth Cross-Domain Transfer Facility, Department of Computer Science; The University of Arizone, Oct. 26, 1993, 14 pages—http://citeseerx.ist.psu.edu/viewdoc/download?doi=10.1.1.55.8375&rep=rep1&type=pdf.

Juniper Networks, Technical Documentation, Configuring Global Ingress and Egress Shared Buffers, Published: Jan. 16, 2013, 2 pages—http://www.juniper.net/techpubs/en_US/junos13.2/topics/task/configuration/cos-shared-buffer-global-qfx-series-cli.html.

Chadd, Adrian, Andrian Chadd's Ramblings, Hacking on Receive Side Scaling (RSS) on FreeBSD, Experimenting with Zero-Copy Network IO in FreeBSD-HEAD, downloaded Jun. 27, 2014, 3 pages—http://adrianchadd.blogspot.in/2013/12/experimenting-with-zero-copy-network-io.html—http://msdn.microsoft.com/en-us/library/windows/hardware/ff567236(v=vs.85).aspx.

Koponen, Teemu et al., Network Virtualization in Multi-tenant Datacenters, International Computer Science Institute and UC Berkeley, USENIX The Advanced Computing Systems Association; Included in the Proceedings of the 11$^{th}$ USENIX Symposium on Networked Systems Design and Implementation (NSDI '14), Apr. 2-4, 2014, Seattle, WA, USA. https://www.usenix.org/conference/nsdi14/technical-sessions/presentation/koponen, 2013, 15 pages (pp. 202-216)—https://www.google.com/url?sa=t&rct=j&q=&esrc=s&source=web&cd=2&cad=ria&uact=8&ved=0CC4QFjAB&url=http%3A%2F%2Fdownload3.vmware.com%2Fsoftware%2Fvmw-tools%2Ftechnical_reports%2Fnetwork_virt_in_multi_tenant_dc.pdf&ei=ru1QU6KqEIOyrgfdhoCYCQ&usg=AFQjCNEt3OrdyjgywyVrV6LF4QdCZ9PLow&bvm=bv.65058239.d.bmk.

Mapp, Glenford, Low Latency Networking, Digital Technology Group Computer Laboratory, http://www.cl.cam.ac.uk/Research/DTG/~gem11 downloaded Jun. 27, 2014, 56 pages—https://www.google.com/url?sa=t&rct=j&q=&esrc=source=web&cd=1&cad=rja&uact=8&ved=0CCUQFjAA&url=http%3A%2Fwww.cl.cam.ac.uk%2Fteaching%2F0708%2FAddTopics%2Flow-Latency-Networking.ppt&ei=HO5QU_6K16KLrQfw8IGICA&usg=AFQiCNFAHlyCxBl4UcVU26213Lxffx9yRQ&bvm=bv.85058239.d.bmk.

Wood et al., "CloudNet: Dynamic Pooling of Cloud Resources by Live WAN Migration of Virtual Machines", 2011.

DYNAMIC BATCH MANAGEMENT OF SHARED BUFFERS FOR VIRTUAL MACHINES

PRIORITY INFORMATION

This application is a continuation of U.S. patent application Ser. No. 15/174,637 filed Jun. 6, 2016, and entitled "Dynamic Batch Management for Shared Buffers for Virtual Machines", which is a continuation of U.S. patent application Ser. No. 14/472,584, filed Aug. 29, 2014, the disclosures of which are hereby incorporated by reference in entirety.

TECHNICAL FIELD

Examples of the present disclosure generally relate to computer networking, and more specifically, relate to dynamic batch management of shared packet buffers in computer systems.

BACKGROUND

Packet processing generally refers to the analysis, modification, and transfer of network packets performed by various computer systems and devices of a communications network. One type of network packet batch processing is TCP Segmentation Offload (TSO). In TSO, network packets sharing the same TCP header information are batched together to streamline network packet processing.

Another type of network packet batch processing provides batching of network packets from arbitrary TCP flows. For example, network packets that do not share the same TCP header information may be batched together to reduce CPU overhead of TCP/IP processing on fast networks.

In general, the unpredictable nature of network traffic generally results suboptimal batch processing of network packets at various times. Accordingly, improved methods of network packet batch management that are more responsive to changes in network traffic can provide more consistent and better overall performance.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
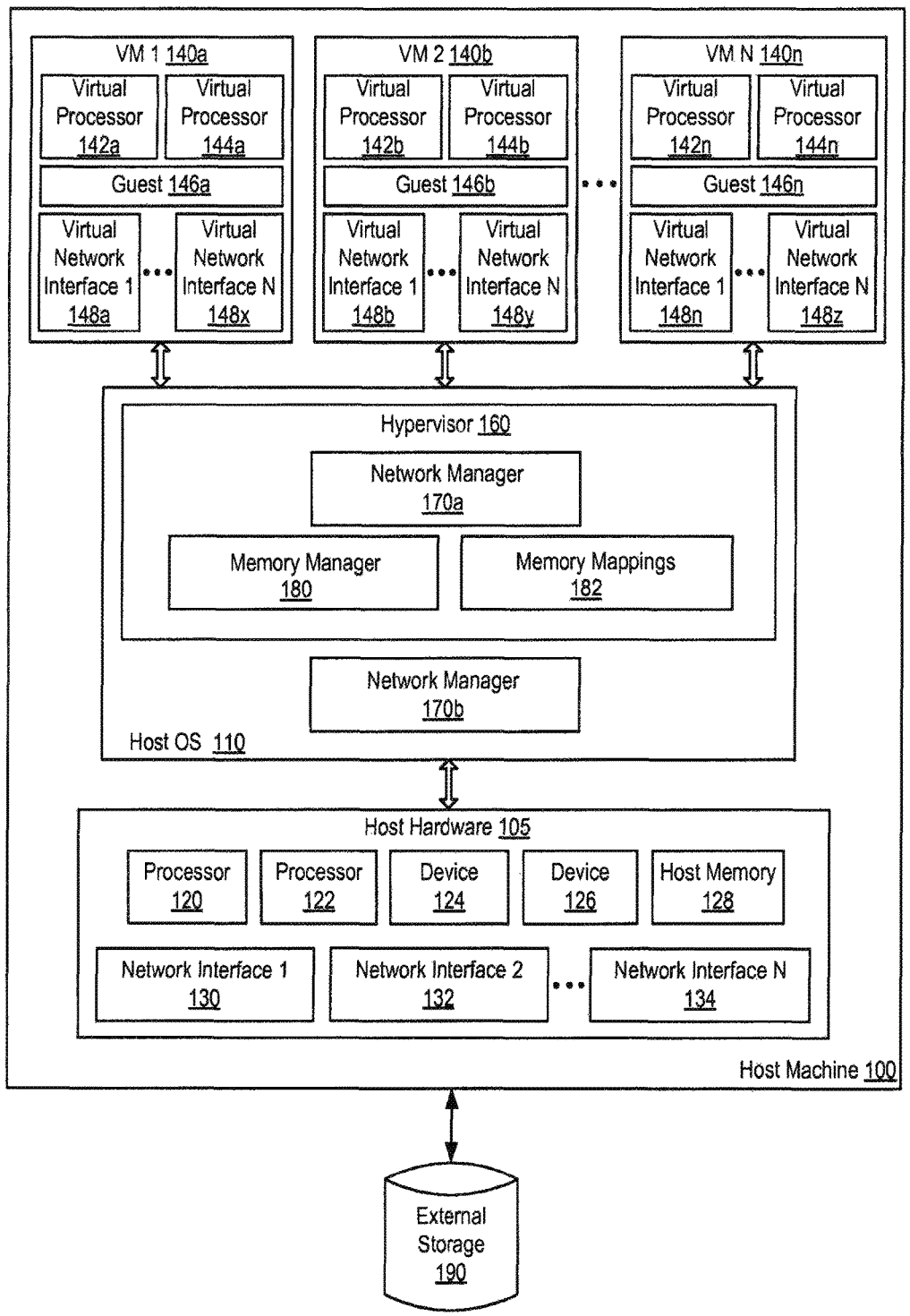
FIG. 1 is a block diagram illustrating an example of a computer system hosting one or more virtual machines.

Disclosed herein are systems, methods, and computer program products for providing dynamic batch management of shared packet buffers in computer systems.

In an example, a memory management module of a hypervisor maintains an area of host memory to store incoming network packets from a network device. The pool of host memory maintained by the memory management module is accessible to at least one network device and at least one guest. Further, the memory management module uses the pool of host memory to perform batch processing of incoming network packets received from one or more network devices.

In an example, the memory management module adjusts a number of memory buffers associated with the pool of host memory to resize the pool of host memory. For example, the memory management module may resize a pool of host memory used to perform batch processing of network packets one or more times after an initial set of memory buffers has been allocated to the pool. In one example, the memory management module detects that a number of available memory buffers in the pool of host memory is below a threshold. In response, the memory management module may increase the size of the pool of host memory by adding additional memory buffers to the pool. The memory management module may initialize the additional memory buffers before allocation to the pool of host memory to prevent sharing of private host data.

In an example, the memory management module detects that a number of available memory buffers in the pool of host memory is above a threshold. In response, the memory management module may decrease the size of the pool of host memory by removing memory buffers allocated to the pool. The memory management module then may return the memory buffers removed from the pool to a host machine or may use the removed memory buffers for another purpose.

In an example, the memory management module receives an indication that one or more incoming network packets have been stored in the pool of host memory by a network device. For example, the memory management module may receive a notification from the network device or may detect that incoming packets have been stored in the pool of host memory. In one example, the memory management module provides incoming network packets stored in the pool of host memory to a guest. For example, the memory management module may provide the guest with one or more memory addresses or memory address ranges of memory buffers holding incoming network packets for the guest.

Accordingly, the memory management module provides dynamic memory management of a pool of host memory used to perform batch processing of network packets. Such dynamic memory management allows flexible reallocation of memory resources during operation of a computer system based on changes in performance. Further, such dynamic memory management is performed automatically during operation of a computer system without manual intervention by an administrator.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a physical computer system, referred to herein as a host machine 100 that hosts one or more virtual machines (VMs) (e.g., VM1 140*a*, VM2 140*b* and VM N 140*n*). Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, host memory 128, multiple network interfaces 130, 132, 134, and other hardware components. Host memory 128 may include volatile memory devices (e.g., random access memory (RAM)), non-volatile memory devices (e.g., flash memory), and/or other types of memory devices. Host hardware 105 also may be coupled to external storage 190 via a direct connection or a local network. Host machine 100 may be a single machine or multiple host machines arranged in a cluster.

In an example, each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

A "processing device" generally refers to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 190), external I/O devices, etc. Devices 124, 126 communicate with host machine 100 (e.g., notify host machine 100 of events) by generating device interrupts.

Host machine 100 includes multiple network interfaces 130, 132, 134 that connect to host machine 100 to one or more networks. A network generally refers to any computer or telecommunications data path that allows the exchange of data between computer systems. Networks may include but are not limited to wired networks, wireless networks, public networks (e.g., the Internet), private networks (e.g., a local area network (LAN), a metropolitan area network (MAN), a wide area network (WAN)), fibre channel communication, or any combination thereof. Each network interface 130, 132, 134 allows host machine 100 to send and receive data via one or more networks.

Each network interface 130, 132, 134 may include one or more processors and one or more memory devices, which may be part of an application-specific integrated circuit (ASIC) of a network interface. The processors may perform operations on data within a respective network interface, for example, by preparing packets for transmission over a network, receiving packets from a network, etc. The memory devices may include read-only memory and/or random access memory for storing instructions to be executed, referenced, or otherwise used by the processors.

Further, each network interface generally has a unique media access control (MAC) address used in switching and in other networking processing.

Host machine 100 includes a hypervisor 160 (also known as a virtual machine monitor (VMM)). In one example (as shown), hypervisor 160 is a component of a host operating system 110. Alternatively, hypervisor 160 may run on top of a host OS 110, or may run directly on host hardware 105 without the use of a host OS 110.

Hypervisor 160 manages system resources, including access to host memory 128, devices 124, 126, network interfaces 130, 132, 134, secondary storage, and so on. Hypervisor 160, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 160 presents to other software (i.e., "guest" software) the abstraction of one or more virtual machines (VMs) (e.g., VM 1 140a, VM 2 140b, VM N 140n), which may provide the same or different abstractions to various guest software (e.g., guest operating system, guest applications).

Host machine 100 hosts any number of virtual machines (VMs) (e.g., a single VM, one hundred VMs, etc.). A virtual machine (e.g., VM 1 140a, VM 2 140b, VM N 140n) is a combination of guest software that uses an underlying emulation of host machine 100 (e.g., as provided by hypervisor 160). Guest software (e.g., guest 146a, 146b, 146n) may include a guest operating system, guest applications, guest memory, guest device drivers, etc. Virtual machines 140a, 140b, 140n can be, for example, hardware emulation, full virtualization, para-virtualization, and operating system-level virtualization virtual machines. Virtual machines 140a, 140b, 140n may have the same or different guest operating systems, such as Linux®, Solaris®, Microsoft® Windows®, etc.

In an example, "containers" may be utilized in addition or as an alternative to virtual machines. A container (not shown) generally refers to an isolated slice or set of operating system resources. For example, a container may provide a set of namespace-isolated computer system resources that are neither accessible nor visible to application processes running outside of the container. Containers may exist on the same host machine 100 as virtual machines and also may be managed by a hypervisor 160. Further, examples presented herein with respect to virtualized computing systems may also be applied to containers. Thus, a "guest" generally may refer to any virtualized tenant managed by a hypervisor 160, which includes but is not limited to virtual machines and containers.

Guest memory (not shown) generally describes memory allocated to and available for use by a guest 146a, 146b, 146n. In an example, guest memory may be memory presented to a guest OS by hypervisor 160. In one example, guest memory is mapped to and provided using corresponding memory from a host machine 100 (e.g., host memory 128). For example, a page (or other unit) of guest memory may be mapped to and provided using a corresponding page (or other unit) of host memory 128.

Each virtual machine 146a, 146b, 146n may include multiple virtual processors (e.g., virtual processors 142a and 144a, 142b and 144b, 142n and 144n). Each virtual processor of a respective virtual machine executes on a specific processor 120, 122 of host machine 100. Hypervisor 160 may control which virtual processors run on which hardware processors 120, 122. For example, one virtual processor may run on a physical processor 120, and a second virtual processor may run on a different physical processor 122 (or vice versa).

Each virtual machine (VM 1 140*a*, VM2 140*b* . . . VM N 140*n*) may include multiple virtual network interfaces (e.g., virtual network interface 1 148*a* . . . virtual network interface N 148*x*, virtual interface 1 148*b* . . . virtual network interface N 148*y*, virtual network interface 1 148*n* . . . virtual network interface N 148*z*). A virtual network interface generally refers to an emulation of a physical networking interface provided for a virtual machine. Each network interface (e.g., network interface 1 130, network interface 2 132, network interface N 134) can be used to provide underlying network communication for one or more virtual network interfaces.

Hypervisor 160 includes a network manager 170*a*. Host OS 110 also may include a network manager 170*b* (e.g., additionally or alternatively). In an example, a network manager 170*a*, 170*b* manages interaction between virtual network interfaces (e.g., virtual network interface 1 148*a*) and physical network interfaces (e.g., network interface 1 130). In one example, a network manager 170*a*, 170*b* creates and maintains network interface mappings between network interfaces, such as between a virtual and a physical network interface.

In an example, a network manager 170*a*, 170*b* receives and processes inbound and outbound network packets. For example, a network manager 170*a*, 170*b* may receive inbound network packets from one or more network interfaces (e.g., network interface 1 130 . . . network interface N 134) that are to be delivered to one or more virtual machines (e.g., VM1 140*a* . . . VM N 140*n*). A network manager 170*a*, 170*b* also may receive outbound network packets from one or more virtual machines (e.g., VM1 140*a* . . . VM N 140*n*) that are to be sent over a network by one or more network interfaces (e.g., network interface 1 130 . . . network interface N 134).

In an example, a network manager 170*a*, 170*b* also examines network packets, updates network packets, and forwards network packets to appropriate physical and virtual network interfaces. The term "network packet" generally refers to a data packet or other formatted data unit that is transferrable over a packet-switched network (e.g., IP packets).

Hypervisor 160 also includes a memory manager 180 and memory mappings 182. In an example, memory manager 180 tracks and manages associations between guest memory (not shown) and host memory 128 using memory mappings 182. For example, memory manager 180 may maintain a table, list or other data structure that associates an address of guest memory (e.g., a guest address) with an address of corresponding host memory 128 (e.g., a host address). A "guest address" generally may refer to either a virtual or physical guest memory address. In addition, a "host address" generally may refer to either a virtual or physical host memory address.

Figure 2:
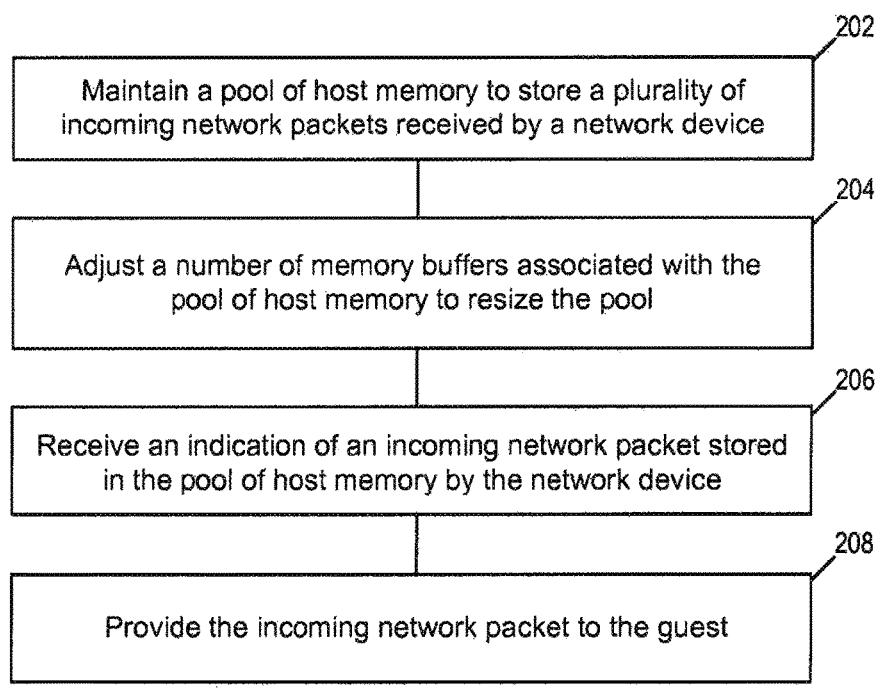
FIG. 2 is a flow diagram illustrating an example of dynamic batch management of shared packet buffers in a virtualized computer system.

FIG. 2 is a flow diagram illustrating an example of dynamic batch management of shared packet buffers in a virtualized computer system. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when memory manager 180 maintains a pool of host memory to store a plurality of incoming network packets received by a network device. In an example, memory manager 180 of hypervisor 160 allocates and maintains a pool of host memory to store incoming network packets received by a network device. For example, memory manager 180 may allocate a pool of host memory comprising a plurality of memory buffers to perform batch processing of incoming network packets received by a network device (e.g., network interface 1 130) for one or more guests (e.g., virtual machines and/or containers).

In an example, memory manager 180 provides a network device with access to a pool of host memory used to perform batch processing of network packets for guests. For example, memory manager 180 may associate or map the network device to the pool of host memory to allow the network device to write data in the pool of host memory. In one example, the network device stores incoming network packets that it receives in the pool of host memory and also notifies memory manager 180 about available incoming network packets stored in the pool.

In an example, memory manager 180 provides one or more guests with access to the pool of host memory. For example, memory manager 180 may associate or map each of one or more guests to the pool of host memory to allow each guest to access incoming network packets stored in the pool. In one example, memory manager 180 provides guests with read access to memory buffers in the pool of host memory.

At block 204, memory manager 180 adjusts a number of memory buffers associated with the pool of host memory to resize the pool of host memory. In an example, memory manager 180 of hypervisor 160 resizes an existing pool of host memory used to perform batch processing of network packets received by a network device for one or more guests. For example, memory manager 180 may increase the size of the pool of host memory by adding one or more additional memory buffers to pool. Memory manager 180 also may decrease the size of the pool of host memory by removing one or more memory buffers allocated to the pool. In one example, memory manager 180 resizes the pool of host memory used to perform batch processing of network packets one or more times after initial allocation of the pool of host memory.

In an example, memory manager 180 adjusts a number of memory buffers associated with a pool of host memory used to perform batch processing of network packets in response to an event, condition, or request. For example, memory manager 180 may perform an action, detect an event, or receive notification of an event (such as the addition or removal of one or more guests). In one example, memory manager 180 resizes the pool of host memory used to perform batch processing of network packets by increasing or decreasing a number of memory buffers associated with the pool. For example, memory manager 180 may increase the size of the memory pool when one or more guests are created or may decrease the size of memory pool when one or more guests are removed.

In an example, memory manager 180 adjusts the number of memory buffers associated with a pool of host memory based on a condition. In one example, memory manager 180 adds one or more memory buffers to the pool of host memory when detecting that available or free memory buffers in the pool is below a threshold. Memory manager 180 also may remove one or more memory buffers from the pool of host memory in response to detecting that available or free memory buffers in the pool is above a threshold.

In an example, memory manager 180 adds additional memory buffers to the pool of host memory by mapping (e.g., associating) the additional memory buffers to one or more guests. Memory manager also may remove memory buffers from the pool of host memory by unmapping (e.g., disassociating) memory buffers in the pool from guests.

In an example, memory manager 180 detects or receives notification that one more memory buffers in the pool of host memory are to be reassigned for a different use. For example, memory manager 180 may detect or receive notification of a low memory condition involving host machine 100 or a guest. In response, memory manager 180 then may reduce the size of the pool of host memory by removing one or more memory buffers from the pool so that the freed memory buffers may be reallocated for a different purpose. For example, memory manager 180 may return memory buffers removed from the pool of host memory to a host machine 100 or reallocate the memory buffers for another use.

At block 206, memory manager 180 receives an indication of an incoming network packet stored in the pool of host memory by the network device. In an example, memory manager 180 of hypervisor 160 detects that an incoming network packet has been stored in the pool of host memory by a network device. A network device also may notify memory manager 180 that one or more incoming network packets are available in the pool of host memory.

At block 208, memory manager 180 provides the incoming network packet to the guest. In an example, memory manager 180 of hypervisor 160 notifies a guest that an incoming network packet is available for the guest in the pool of host memory. For example, memory manager 180 may provide a guest with one or more memory addresses or ranges of memory addresses associated with memory buffers in the pool of host memory where incoming network packets for the guest are stored. In an example, a single memory buffer may store one or more incoming network packets for a guest. In addition, memory manager 180 may provide one or more of the same memory buffers to different guests having access to the pool memory to allow each guest to receive the same network packets where appropriate. In one example, memory manager 180 receives a notification from a guest indicating that the guest is finished using one or more memory buffers provided to the guest by memory manager 180.

Figure 3:
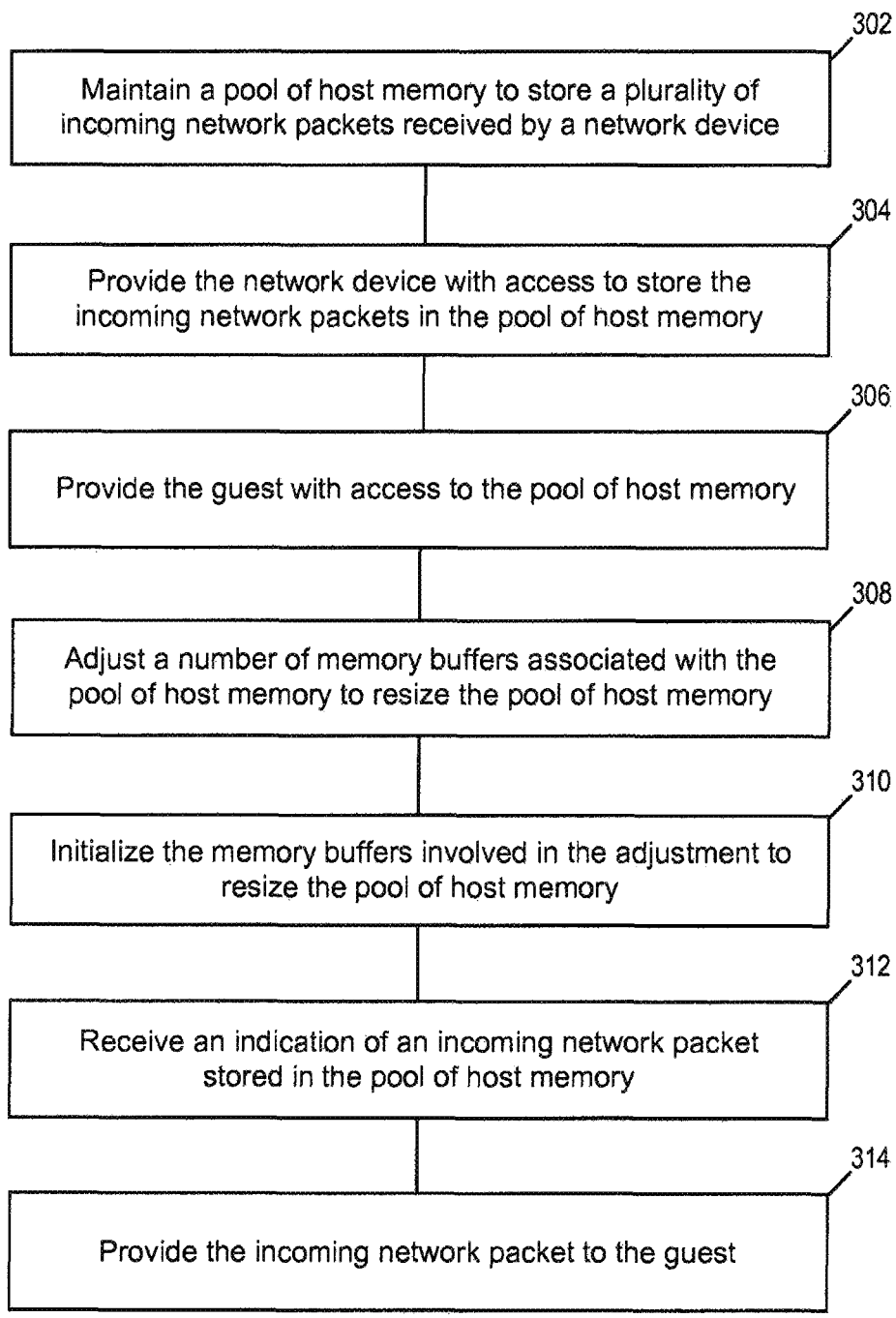
FIG. 3 is a flow diagram illustrating an example of dynamic adjustment of shared packet buffers in a virtualized computer system.

FIG. 3 is a flow diagram illustrating an example of dynamic adjustment of shared packet buffers in a virtualized computer system. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 300 begins at block 302 when memory manager 180 maintains the pool of host memory to store a plurality of incoming network packets received by a network device. In an example, memory manager 180 of hypervisor 160 maintains a pool of host memory to store incoming network packets from a network device that are to be received by one or more guests (e.g., virtual machines and/or containers). For example, memory manager 180 may allocate and use the pool of host memory to perform batch processing of incoming network packets for a group of one or more guests having access to the pool.

In an example, memory manager 180 maintains multiple pools of host memory that are each used to perform batch processing of incoming network packets for different groups of guests. For example, one pool of host memory may be used to perform batch processing of incoming network packets for a first set of one or more guests while another pool of host memory may be used to perform a similar function for a second set of one or more different guests. In one example, each pool of host memory maintained by memory manager 180 is associated with one or more different network devices, and each network device is associated with a single pool of host memory.

At block 304, memory manager 180 provides the network device with access to store the incoming network packets in the pool of host memory. In an example, memory manager 180 of hypervisor 160 provides one or more network devices with access to a pool of host memory used to perform batch processing of network packets for one or more guests. In one example, memory manager 180 provides a network device with one or more memory addresses or memory address ranges for memory buffers in the pool of host memory where the network device can store incoming network packets that are to be received by one or more guests.

At block 306, memory manager 180 provides the guest with access to the pool of host memory. In an example, memory manager 180 of hypervisor 160 provides one or more guests with access to the pool of host memory by mapping memory buffers in the pool to each guest. In one example, memory manager 180 maps the memory buffers to each guest to allow guests to share the pool of host memory and to receive incoming network packets stored in the pool. In an example, memory manager 180 initializes memory buffers in the pool of host memory before providing the memory buffers to a guest. In one example, memory manager 180 deletes or overwrites data in memory buffers to ensure that memory buffers provided to a guest do not include private host data.

At block 308, memory manager 180 adjusts the number of memory buffers associated with the pool of host memory to resize the pool. In an example, memory manager 180 of hypervisor 160 increases the size of a pool of host memory used to perform batch processing of network packets by adding one or more memory buffers to the pool. For example, memory manager 180 may increase the size of the pool in response to detecting that an amount of available memory in the pool is below a threshold.

In an example, memory manager 180 adds additional memory buffers to the pool of host and maps the addition memory buffers to each of one or more guests having access to the pool. In one example, mapping of additional memory buffers to a guest is deferred until the hypervisor 160 detects that a guest attempts to access one or more of the additional memory buffers.

In an example, memory manager 180 of hypervisor 160 decreases the size of a pool of host memory used to perform batch processing of network packets by removing one or more memory buffers from the pool. For example, memory manager 180 may decrease the size of the pool in response to detecting that available memory buffers in the pool are above a threshold.

In an example, memory manager 180 unmaps unused memory buffers from the pool of host memory. Unused memory buffers generally refer to memory buffers that are not in use by a guest or other process. In one example, memory manager 180 unmaps unused memory buffers from each guest having access to the pool of host memory.

At block 310, memory manager 180 initializes the memory buffers involved in the adjustment to resize the pool of host memory. In an example, memory manager 180 of hypervisor 160 initializes memory buffers added to or removed from a pool of host memory used to perform batch processing of network packets. For example, memory manager 180 may initialize the added memory buffers to prevent guests from accessing private host data. Similarly, memory manager may initialize removed memory buffers to prevent inadvertent disclosure of private guest data. In one example, memory manager 180 initializes memory buffers by writing over or deleting data stored in the memory buffers. In some examples, memory manager 180 also may fill the memory buffers with data, such as zeros, ones, random data, or any other data.

In an example, memory manager 180 initializes additional memory buffers prior to associating the memory buffers with a pool of host memory used to perform batch processing of network packets. In one example, memory manager initializes the additional memory buffers prior to mapping or providing the additional memory buffers to a guest. In one example, memory manager 180 initializes unused memory buffers that are to be removed from a pool of host memory used to perform batch processing of network packets. For example, memory manager 180 may initialize the memory buffers prior to unmapping the memory buffers from the pool of host memory to prevent sharing of any residual guest data that remains in the memory buffers.

At block 312, memory manager 180 receives an indication of an incoming network packet stored in the pool of host memory. In an example, memory manager 180 of hypervisor 160 detects that incoming network packets provided by a network device are available in the pool of host memory. In one example, a network device notifies memory manager 180 that incoming network packets are available for guests in the pool of host memory.

At block 314, memory manager 180 provides the incoming network packet to the guest. In an example, memory manager 180 of hypervisor 160 provides a guest with incoming network packets by sending the guest one or more memory addresses or memory address ranges for memory buffers holding incoming network packets for the guest. In one example, memory manager 180 provides one or more of the same memory buffer addresses to different guests that are to receive the same network packets. In some examples, memory manager 180 receives a guest notification indicating that the guest has finished use of one or more memory buffers provided to the guest by memory manager 180.

Figure 4:
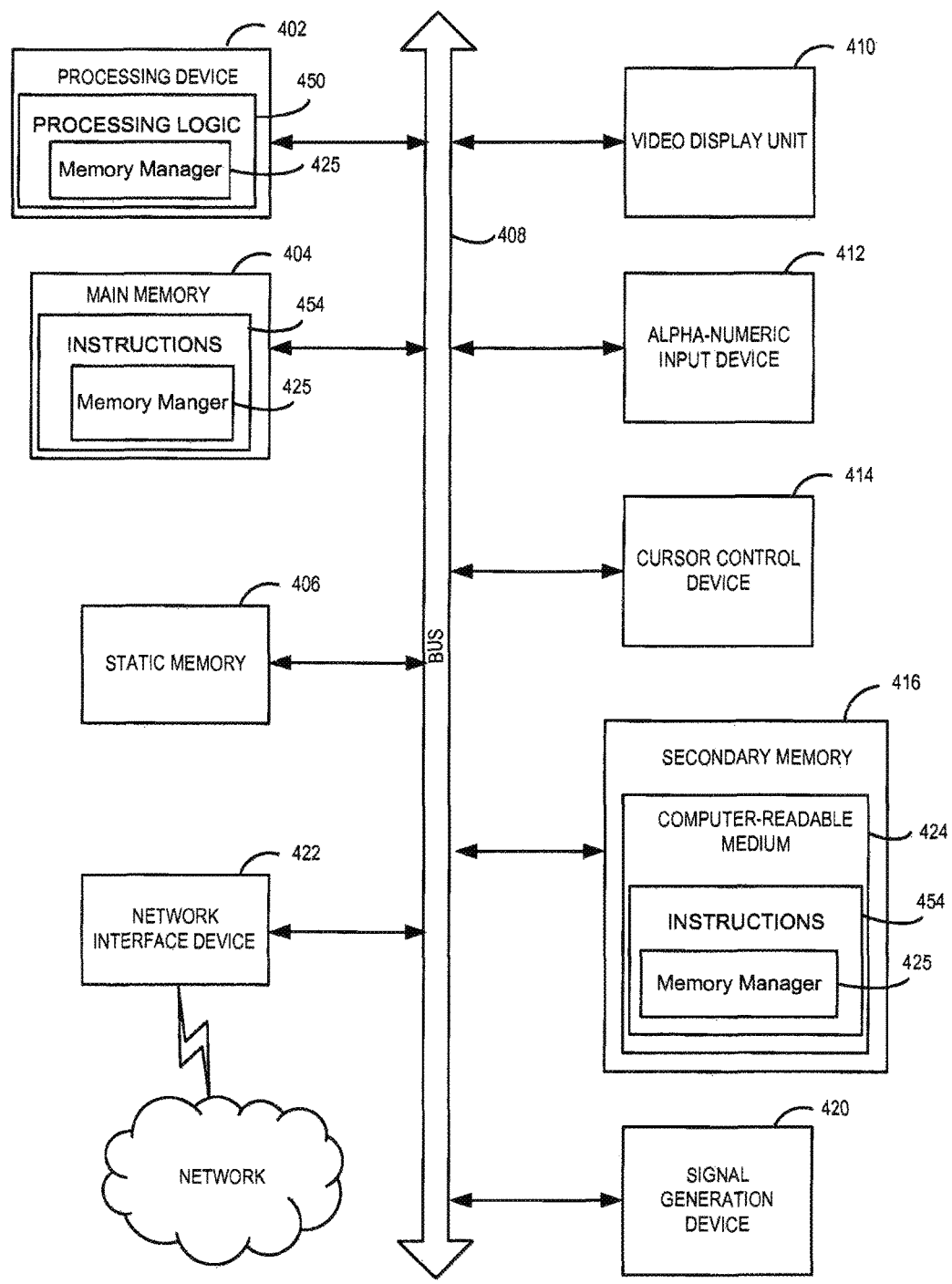
FIG. 4 illustrates a diagrammatic representation of a machine in the example form of a computer system.

FIG. 4 illustrates a diagrammatic representation of a machine in the example form of a computer system 400 within which a set of instructions, for causing the machine to perform any one or more of the methodologies discussed herein, may be executed. The computer system 400 may correspond, for example, to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processing devices such as a microprocessor, central processing unit, or the like. The processing device may include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 also may be one or more special-purpose processing devices such as an application specific integrated circuit (ASIC), a field programmable gate array (FPGA), a digital signal processor (DSP), network processor, or the like.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., memory manager 425). The instructions 454 may also reside, completely or at least partially, within the main memory 404 and/or within the processing device 402 during execution thereof by the computer system 400 (the main memory 404 and the processing device 402 constituting machine-readable storage media).

While the computer-readable storage medium 424 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 400 additionally may include a network manager module (not shown) for implementing the functionalities of a memory manager 425 (e.g., memory manager 180). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "processing", "executing", "modifying", "creating", "detecting," "copying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
maintaining, by a hypervisor executed by a processor, a plurality of virtual machine guests and a pool of host memory to store a plurality of incoming network packets received by a physical network device, the plurality of incoming network packets comprising incoming network packets associated with one or more virtual machine guests of the plurality of virtual machine guests, and the pool of host memory being accessible to the physical network device and at least one of the one or more virtual machines guests of the plurality of virtual machines;
adjusting, by the hypervisor, a number of memory buffers associated with the pool of host memory to resize the pool of host memory in association with providing respective incoming network packets to the one or more virtual machine guests, the memory buffers being adjusted in view of the one or more virtual machine guests, wherein, after the adjusting, the number of memory buffers includes a newly added memory buffer that is not yet mapped to a virtual machine;
receiving, by the hypervisor, an indication that the incoming network packets associated with the one or more virtual machine guests are stored in the pool of host memory;
providing, by the hypervisor, respective incoming network packets to the one or more virtual machine guests;
deferring mapping of the newly added memory buffer to one of the plurality of virtual machine guests until the one of the plurality of virtual machines guests attempts to access the newly added memory buffer.

2. The method of claim 1, further comprising:
providing, by the hypervisor, the physical network device with access to store the incoming network packets in the pool of host memory.

3. The method of claim 1, further comprising:
storing, by the physical network device, the incoming network packets in the pool of host memory.

4. The method of claim 1, further comprising:
notifying, by the physical network device, the hypervisor that the incoming network packets are stored in the pool of host memory.

5. The method of claim 1, further comprising:
providing, by the hypervisor, each of the one or more virtual machine guests with direct access to the pool of host memory.

6. The method of claim 5, wherein the hypervisor provides at least one of the one or more virtual machine guests with direct access to the pool of host memory in response to a corresponding virtual machine guest performing an operation involving a memory buffer in the pool of host memory.

7. The method of claim 1, further comprising:
detecting, by the hypervisor, that available memory in the pool of host memory is below a threshold.

8. The method of claim 1, wherein the adjusting comprises:
adding, by the hypervisor, one or more additional memory buffers to the pool of host memory in view of allocating at least one additional virtual machine guest.

9. The method of claim 8, further comprising:
initializing, by the hypervisor, the one or more additional memory buffers added to the pool of host memory for processing the respective incoming network packets.

10. The method of claim 1, further comprising:
detecting, by the hypervisor, that one or more memory buffers in the pool of host memory are to be reassigned for a different use.

11. The method of claim 10, further comprising:
initializing, by the hypervisor, the one or more memory buffers to be reassigned.

12. The method of claim 1, wherein the adjusting comprises:
removing, by the hypervisor, one or more memory buffers from the pool of host memory in view of deallocating at least one virtual machine guest.

13. The computer-implemented method of claim 1, further comprising:
maintaining, by the hypervisor, a second pool of host memory comprising a second set of one or more memory buffers to store incoming network packets for one or more other virtual machine guests.

14. The method of claim 1, wherein the hypervisor adjusts the number of memory buffers in response to detecting an event.

15. The method of claim 1, wherein the hypervisor adjusts the number of memory buffers in response to detecting a memory condition.

16. The method of claim 1, wherein the hypervisor uses the pool of host memory to perform batch processing of the incoming network packets to provide respective incoming network packets to the one or more virtual machine guests.

17. A non-transitory computer-readable storage medium having instructions recorded thereon, that when executed by a processor, cause the processor to perform operations, comprising:
maintaining, by a hypervisor executed by the processor, a pool of host memory to store a plurality of incoming network packets received by a physical network device, the plurality of incoming network packets comprising incoming network packets associated with different virtual machine guests, and the pool of host memory being accessible to the physical network device and the virtual machine guests;
adjusting, by the hypervisor, a number of memory buffers associated with the pool of host memory to resize the pool of host memory;
receiving, by the hypervisor, an indication that the incoming network packets associated with the virtual machine guests are stored in the pool of host memory;
providing, by the hypervisor, incoming network packets to the virtual machine guests; and
deferring mapping of a newly added memory buffer of the number of memory buffers to one of the plurality of virtual machine guests until the one of the plurality of virtual machines guests attempts to access the newly added memory buffer.

18. The non-transitory computer-readable storage medium of claim 17, wherein the adjusting comprises:
adding, by the hypervisor, one or more additional memory buffers to the pool of host memory in view of a newly allocated virtual machine guest.

19. The non-transitory computer-readable storage medium of claim 17, wherein the adjusting comprises:
removing, by the hypervisor, one or more memory buffers from the pool of host memory in response to deallocating at least one of the virtual machine guests.

20. A computer system, comprising:
a memory;
a processor coupled to the memory; and
a hypervisor hosted by the computer system, having access to the memory and use of the processor to:
maintain a pool of the memory to store a plurality of incoming network packets received by a physical network device, the plurality of incoming network packets comprising incoming network packets associated with a plurality of virtual machine guests, and the pool of the memory being accessible to the physical network device and the plurality of virtual machine guests;
adjust a number of memory buffers associated with the pool of the memory to resize the pool in association with providing respective incoming network packets to the plurality of virtual machine guests, wherein, after adjustment, the number of memory buffers includes a newly added memory buffer that is not yet mapped to a virtual machine;
receive an indication that the incoming network packets associated with the plurality of virtual machine guests are stored in the pool of host memory;
provide the respective incoming network packets to the plurality of virtual machine guests; and
defer mapping of the newly added memory buffer of the number of memory buffers to one of the plurality of virtual machine guests until the one of the plurality of virtual machines guests attempts to access the newly added memory buffer.

21. A computer-implemented method, comprising:
maintaining, by a hypervisor executed by a processor, a plurality of virtual machine guests and a pool of host memory to store a plurality of incoming network packets received by a physical network device, the plurality of incoming network packets comprising incoming network packets associated with one or more virtual machine guests of the plurality of virtual machine guests, and the pool of host memory being accessible to the physical network device and at least one of the one or more virtual machines guests of the plurality of virtual machines;
with the hypervisor, in response to determining that the pool of host memory is greater in size than a threshold value, removing a number of memory buffers associated with the pool of host memory by unmapping unused memory buffers from the pool of the host memory and unmappig unused memory buffer from each virtual machine guest having access to the pool of host memory and initializing the memory buffers removed from a pool of the host memory;
receiving, by the hypervisor, an indication that the incoming network packets associated with the one or more virtual machine guests are stored in the pool of host memory;
providing, by the hypervisor, respective incoming network packets to the one or more virtual machine guests.

22. The method of claim 21, further comprising, reallocating a removed memory buffer of the number of memory buffers.

23. The method of claim 21, further comprising, adding a new memory buffer to the number of memory buffers in response to determining that the size of the pool of memory is below a threshold.

24. The method of claim 23, further comprising, deferring mapping of the newly added memory buffer to one of the plurality of virtual machine guests until the one of the plurality of virtual machines guests attempts to access the newly added memory buffer.

25. A computer-implemented method, comprising:
maintaining, by a hypervisor executed by a processor, a pool of host memory to store a plurality of incoming network packets received by a physical network device, the plurality of incoming network packets comprising incoming network packets associated with one or more virtual machine guests, the pool of host memory being accessible to the physical network device and at least one of the one or more virtual machines guests;
adjusting, by the hypervisor, a number of memory buffers associated with the pool of host memory to resize the pool of host memory, wherein, after the adjusting, the number of memory buffers includes a newly added memory buffer that is not yet mapped to a virtual machine;

receiving, by the hypervisor, an indication that the incoming network packets associated with the one or more virtual machine guest are stored in the pool of host memory;

providing, by the hypervisor, respective incoming network packets to the one or more virtual machine guests;

deferring mapping of the newly added memory buffer to one of the plurality of virtual machine guests until the one of the plurality of virtual machines guests attempts to access the newly added memory buffer.

\* \* \* \* \*